US011826802B2

(12) United States Patent
Osse

(10) Patent No.: US 11,826,802 B2
(45) Date of Patent: Nov. 28, 2023

(54) DEVICE AND METHOD FOR PROCESSING OF SPRAY CANS

(71) Applicant: DESPRAY HOLDING B.V., Almelo (NL)

(72) Inventor: Eelco Maarten Osse, Almelo (NL)

(73) Assignee: DESPRAY HOLDING B.V., Almelo (NL)

( * ) Notice: Subject to any disclaimer, the term of this patent is extended or adjusted under 35 U.S.C. 154(b) by 318 days.

(21) Appl. No.: 17/053,849

(22) PCT Filed: May 9, 2019

(86) PCT No.: PCT/NL2019/000007
§ 371 (c)(1),
(2) Date: Nov. 9, 2020

(87) PCT Pub. No.: WO2019/216761
PCT Pub. Date: Nov. 14, 2019

(65) Prior Publication Data
US 2021/0229144 A1 Jul. 29, 2021

(30) Foreign Application Priority Data

May 11, 2018 (NL) ...................... 1042865

(51) Int. Cl.
*B09B 3/00* (2022.01)
*B65B 69/00* (2006.01)
*B09B 101/02* (2022.01)

(52) U.S. Cl.
CPC .............. *B09B 3/00* (2013.01); *B65B 69/005* (2013.01); *B65B 69/0033* (2013.01); *B09B 2101/02* (2022.01)

(58) Field of Classification Search
CPC .............. B65B 69/0033; B65B 69/005; B09B 2101/02; B09B 3/00
See application file for complete search history.

(56) References Cited

U.S. PATENT DOCUMENTS 4,459,906 A * 7/1984 Cound ...................... B09B 3/00
100/98 R
5,114,043 A * 5/1992 Collins, Jr. ............... B09B 3/00
414/412

(Continued)

FOREIGN PATENT DOCUMENTS

CN 102698451 A 10/2012
CN 102748970 A 10/2012

(Continued)

OTHER PUBLICATIONS

International Search Report and Written Opinion for the Patent Application No. PCT/NL2019/000007, dated Feb. 14, 2020, 12.

*Primary Examiner* — Andrew M Tecco
*Assistant Examiner* — Nicholas E Igbokwe
(74) *Attorney, Agent, or Firm* — KDW FIRM PLLC

(57) ABSTRACT

A device for processing spray cans includes a first space, separating means for separating spray cans in the first space, a second space, first transport means for transporting gas from the first space to the second space, and compressing means for compressing gas in the second space. The device also includes second transport means for transporting heat, released during compressing of the gas, from the second space to the first space. The second transport means includes a conduit for having a fluid, flow therethrough. A method for processing of spray cans by means of such a device.

18 Claims, 2 Drawing Sheets

(56) References Cited

U.S. PATENT DOCUMENTS

| | | | | |
|---|---|---|---|---|
| 5,146,848 | A | * | 9/1992 | Dufour .................. B30B 9/321 100/244 |
| 5,566,610 | A | * | 10/1996 | Robinson .............. B30B 9/3003 100/98 R |
| 6,178,882 | B1 | * | 1/2001 | Wagner ..................... B09B 3/00 100/98 R |
| 6,308,618 | B1 | * | 10/2001 | Richard ................... B30B 9/32 100/98 R |
| 2004/0145071 | A1 | * | 7/2004 | Yotsumoto ............... B09B 3/00 264/37.14 |

FOREIGN PATENT DOCUMENTS

| JP | S53013561 A | 2/1978 |
|---|---|---|
| JP | H05039791 U | 5/1993 |
| JP | H05337695 A | 12/1993 |
| JP | 2000342992 A | 12/2000 |
| JP | 2003154492 A | 5/2003 |
| JP | 2003211450 A | 7/2003 |
| JP | 2008073650 A | 4/2008 |

\* cited by examiner

DEVICE AND METHOD FOR PROCESSING OF SPRAY CANS

This is a national stage application filed under 35 U.S.C. § 371 of pending international application PCT/NL2019/000007, filed May 9, 2019, which claims priority to Netherlands Patent Application No. 1042865, filed May 11, 2018, the entirety of which applications are hereby incorporated by reference herein.

FIELD OF THE INVENTION

The invention relates to a device for processing of spray cans, the device comprising a first space, separating means for separating spray cans in the first space, a second space, first transport means for transporting gas from the first space to the second space, and compressing means for compressing gas in the second space. The invention also relates to a method for processing spray cans, the method comprising of separating spray cans in a first space provided for this purpose by means of separating means provided for this purpose, transporting gas from the first space to a second space provided for this purpose by means of first transport means provided for this purpose, and compressing gas in the second space by means of compressing means provided for this purpose. The term 'space' is understood in the context of the invention to mean 'a determined part of the device'.

BACKGROUND OF THE INVENTION

A spray can is a form of packaging comprising a container, generally of tin, aluminium, plastic or glass, which is provided with a valve. The container is filled with an 'active substance', for instance paint, hairspray, shaving foam, whipping cream, glue, spray foam, oil or a toxin, and with a 'propellant gas', for instance butane or propane. When the valve is pressed, the active substance squirts out in the form of a mist, a foam or a powder.

The term 'propellant gas' refers to the chemical substance which provides for the necessary pressure build-up in the container. In a spray can or container, and during processing of spray cans in a device according to the invention, 'propellant gas' occurs both in gaseous and liquid form, and optionally also in dissolved form. Liquid 'propellant gas' sometimes also serves as solvent for the active substance. In order to avoid confusing and physically incorrect terms such as 'liquid (propellant) gas' and 'gaseous (propellant) gas' use is in the context of the invention always made of the terms 'propellant', 'gaseous propellant' and 'liquid propellant'. In most cases the propellant in the container will be largely liquid, wherein its vapour pressure provides for the necessary pressure. The terms 'gas' and 'liquid' are always understood to mean respectively a 'random gas (or gas mixture)' and a 'random liquid (or liquid mixture or solution)'.

Diverse embodiments of methods for processing spray cans are known. Referred to here are used spray cans with a quantity of gas and/or liquid still remaining therein, but possibly also unused, still completely filled, spray cans. The spray cans are here processed one by one, in series or in batches. The containers can here be emptied, disassembled and reused. The spray cans or the containers are however generally perforated and/or shredded/cut into pieces and/or compacted herein. Released gas and liquid can here be captured, and solid material of containers and valves can be collected, for further processing, destruction or reuse.

U.S. Pat. No. 6,178,882B1 describes a device for processing containers, wherein the containers are separated by compacting them in a space by means of a ram and wherein the solid material/'ruptured containers' and the content/'flowable material' are captured separately. The gaseous part of the captured content/'flowable material' can then be separated therefrom, compressed/condensed, and stored under pressure. During the separating the content of the containers is released, gas expands and/or liquid evaporates, cold is thus released and the temperature in the relevant part of the device decreases. During the compressing/condensing of the separated gaseous part heat is conversely released, and the temperature in the relevant part of the device increases.

The present invention now provides a solution for processing spray cans with improved thermal/energy management.

SUMMARY OF THE INVENTION

The invention provides a device of the stated type, characterized in that the device also comprises second transport means configured and suitable for transporting heat, released during compressing of the gas, from the second space to the first space. The invention also provides a method of the stated type, characterized in that the method also comprises of transporting heat, released during compressing of the gas, from the second space to the first space by means of second transport means provided for this purpose. The second transport means for instance comprise here a conduit for having a fluid, preferably a coolant, flow therethrough. Heat which is released during the compressing/condensing of gas in the second space can thus be used to compensate for cold which is released during expansion of gas and/or evaporation of liquid in the first space. It is thus possible to bring about that the first space does not become too cold and the second space does not become too hot, while the whole process is energy-efficient.

The separating means can here comprise compacting means and/or perforating means and/or cutting means for compacting and/or perforating and/or cutting into pieces spray cans in the first space. The solid material of the spray cans or the containers and valves is thus made into smaller pieces and/or compacted and/or escaping of gas and/or liquid or active substance from the containers is facilitated. Preferably, also provided are first discharge means for discharging solid material from the first space, second discharge means for discharging liquid from the first space and third discharge means for discharging liquid from the second space.

When process parameters such as heat flow, gas flow, temperatures and pressures are set correctly, solid material, active substance and propellant are discharged separately, and can then separately be further processed, destroyed or reused, and the process has optimal energy efficiency.

BRIEF DESCRIPTION OF THE DRAWINGS

The invention will be further elucidated hereinbelow on the basis of exemplary embodiments.

EXEMPLARY EMBODIMENTS

Figure 1:
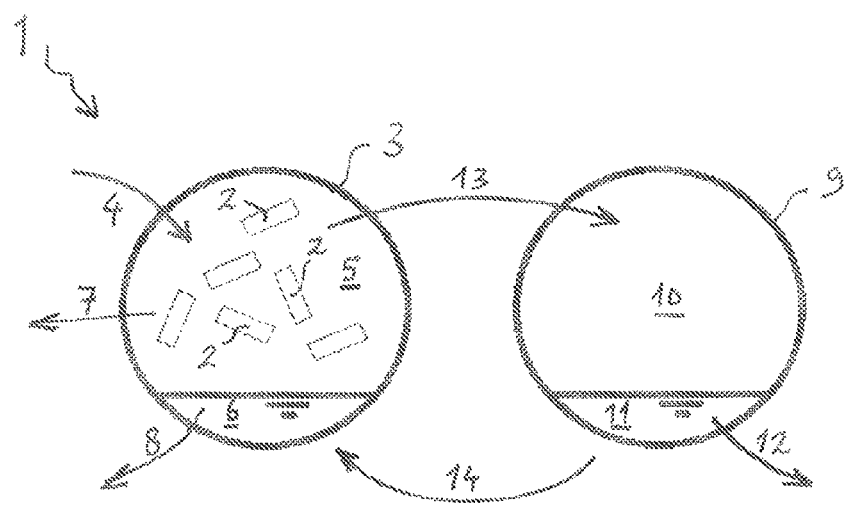
FIG. 1 shows schematically a preferred embodiment of a device according to the invention.
Figure 2:
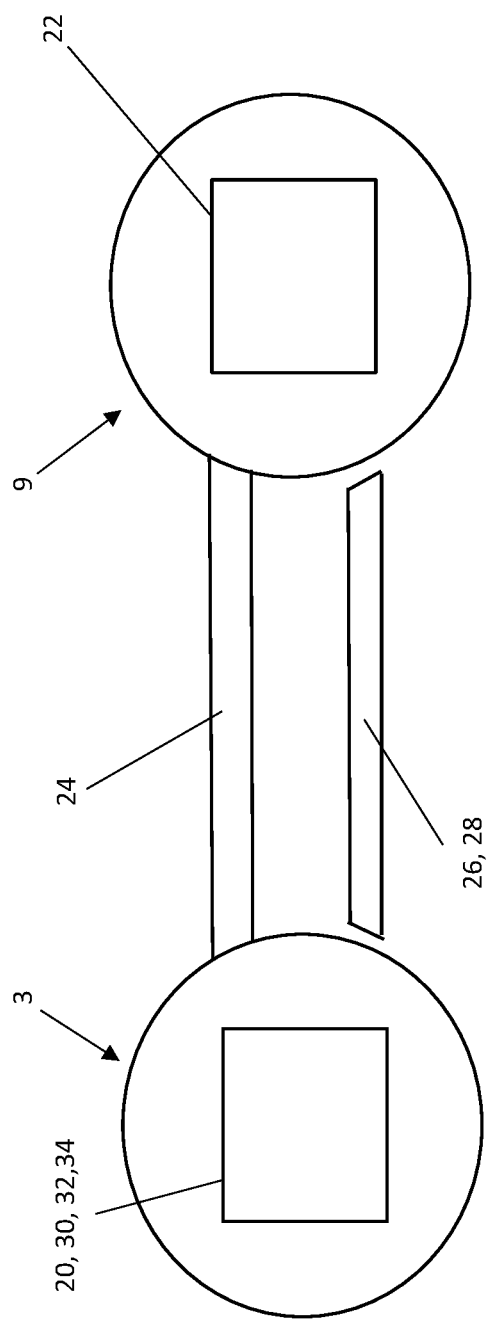
FIG. 2 is another schematic view of the device according to FIG. 1.

The device (1) shown in FIGS. 1 and 2 for processing spray cans (2) comprises a first space (3), separating means

(20) for separating spray cans (2) in the first space (3), a second space (9), first transport means (24) for transporting (13) gas from the first space (3) to the second space (9), and compressing means (22) for compressing gas (10) in the second space (9). The device (1) also comprises feed means for feeding (4) spray cans into the first space (3), first discharge means for discharging (7) solid material of the containers and valves from the first space (3), and second discharge means for discharging (8) liquid (6) from the first space (3). The device (1) also comprises third discharge means for discharging (12) liquid (11) from the second space (9). The separating means (20) can comprise compacting means for compacting spray cans, for instance a ram (32) movable in the first space (3), and/or perforating means (30) for perforating spray cans, and/or cutting means (34) for cutting spray cans into pieces.

For the purpose of processing spray cans (2) they are fed (4) into the first space (3) by means of the feed means and separated in the first space (3) by means of the separating means (20), wherein active substance and propellant are separated from the containers and valves. Solid material of containers and valves is discharged (7) from the first space (3) by means of the first discharge means.

When process parameters such as heat flow (14), gas flow (13), temperatures and pressures are set correctly, active substance (6) is discharged (8) from the first space (3) by means of the second discharge means, and gaseous propellant is transported (13) from the first space (3) to the second space (9) by means of the first transport means (24), and liquid propellant (11) is discharged (12) from the second space (9) by means of the third discharge means. The separated discharged solid material, active substance and liquid propellant can then separately be further processed, destroyed or reused.

According to the invention, the device (1) now also comprises second transport means (26) for transporting (14) heat, released during con/pressing of the gas (10), from the second space (9) to the first space (3). The second transport means (26) can for instance comprise a conduit (28) for having a fluid, a liquid or gas preferably a coolant, flow therethrough. Heat which is released during the compressing/condensing of the gas (10) or gaseous propellant in the second space (9) can thus be used to compensate for cold which is released during expansion of gas/evaporation of liquid or liquid propellant in the first space (3). It is thus possible to bring about that the first space (3) does not become too cold and the second space (9) does not become too hot, while the whole process is energy-efficient.

It will be apparent that the invention is not limited to the given exemplary embodiments, but that within the scope of the invention diverse variants obvious to a skilled person are possible. The invention can thus also be applied in the processing of containers with content other than spray cans.

REFERENCE NUMERALS USED 1 device
2 spray can
3 first space
4 feed of spray cans (into the first space)
5 gas (in first space)
6 liquid (in first space)
7 discharge of solid material (from first space)
8 discharge of liquid (from first space)
9 second space
10 gas (in second space)
11 liquid (in second space)
12 discharge of liquid (from second space)
13 transport of gas (from first space to second space)
14 transport of heat (from second space to first space)
20 Separating means
22 Compressing means
24, 26 First, second transport means
28 Conduit
30 Perforating means
32 Ram
34 Cutting means

The invention claimed is:

1. A device for processing of spray cans, the device comprising:
a first space,
a separator for separating spray cans in the first space,
a second space,
a first transporter for transporting gas from the first space to the second space, and
a compressor for compressing gas in the second space,
wherein the device further comprises a second transporter configured for transporting heat, released during compressing of the gas, from the second space to the first space.

2. The device as claimed in claim 1, wherein the second transporter comprises a conduit for having a fluid flow therethrough.

3. The device as claimed in claim 1, wherein the separator comprises compacting means for compacting spray cans.

4. The device as claimed in claim 3, wherein the compacting means comprises a ram movable in the first space.

5. The device as claimed in claim 1, wherein the separator comprises perforating means for perforating spray cans.

6. The device as claimed in claim 1, wherein the separator comprises a cutter for cutting spray cans into pieces.

7. The device as claimed in claim 1, wherein the device further comprises a first discharger for discharging solid material from the first space.

8. The device as claimed in claim 7, wherein the device further comprises a second discharger for discharging liquid from the first space.

9. The device as claimed in claim 8, wherein the device further comprises third discharger for discharging liquid from the second space.

10. A method for processing of spray cans, the method comprising:
separating spray cans in a first space by means of a separator provided for this purpose,
transporting gas from the first space to a second space by means of a first transporter provided for this purpose, and
compressing gas in the second space by means of a compressor,
wherein the method further comprises transporting heat, released during compressing of the gas, from the second space to the first space by means of a second transporter.

11. The method as claimed in claim 10, wherein the transporting of heat comprises having a fluid, flow through a conduit.

12. The method as claimed in claim 10, wherein the separating comprises of compacting spray cans by means of compacting means.

13. The method as claimed in claim 12, wherein the compacting takes place by means of a ram movable in the first space.

14. The method as claimed in claim 10, wherein the separating comprises of perforating spray cans by a perforator.

15. The method as claimed in claim 10, wherein the separating comprises of cutting spray cans into pieces by a cutter.

16. The method as claimed in claim 10, wherein the method also comprises of discharging solid material from the first space by a first discharger.

17. The method as claimed in claim 16, wherein the method also comprises of discharging liquid from the first space by a second discharger.

18. The method as claimed in claim 17, wherein the method also comprises of discharging liquid from the second space by a third discharger.

* * * * *